United States Patent
Novak et al.

(10) Patent No.: US 10,915,501 B2
(45) Date of Patent: Feb. 9, 2021

(54) INLINE CONTENT FILE ITEM ATTACHMENT

(71) Applicant: Microsoft Technology Licensing, LLC, Redmond, WA (US)

(72) Inventors: Michael Robert Novak, Fishkill, NY (US); John Joseph Lotito, III, New York, NY (US); Arnaud Elie Jean Pierre Vallat, Brooklyn, NY (US); Man Hei Hou, New York, NY (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 264 days.

(21) Appl. No.: 15/631,568

(22) Filed: Jun. 23, 2017

(65) Prior Publication Data

US 2018/0373724 A1 Dec. 27, 2018

(51) Int. Cl.
*G06F 16/14* (2019.01)
*G06Q 10/10* (2012.01)
*G06F 3/048* (2013.01)
*G06F 16/338* (2019.01)
*G06F 16/2457* (2019.01)

(52) U.S. Cl.
CPC .......... *G06F 16/148* (2019.01); *G06F 3/048* (2013.01); *G06F 16/24578* (2019.01); *G06F 16/338* (2019.01); *G06Q 10/10* (2013.01)

(58) Field of Classification Search
CPC .. G06F 16/148; G06F 3/048; G06F 17/30106; G06Q 10/10
See application file for complete search history.

(56) References Cited

U.S. PATENT DOCUMENTS

| 7,870,206 | B2 | 1/2011 | Heidloff et al. |
| 8,082,264 | B2 * | 12/2011 | Bierner ............... G06F 16/3322 707/767 |
| 8,959,109 | B2 | 2/2015 | Scott et al. |
| 10,031,902 | B1 * | 7/2018 | Mach .................... G06F 16/335 |
| 10,261,954 | B2 * | 4/2019 | Grace, Jr. .......... G06F 16/24578 |
| 10,554,805 | B2 * | 2/2020 | Xiao ....................... H04L 51/34 |

(Continued)

OTHER PUBLICATIONS

"Inline Bots", https://core.telegram.org/bots/inline, Published on: Feb. 4, 2017, 4 pages.

(Continued)

*Primary Examiner* — James E Richardson
(74) *Attorney, Agent, or Firm* — Merchant & Gould P.C.

(57) ABSTRACT

Attaching a content file in a composition stream of a content file within a content authoring application is provided. When using a content authoring application to author a content file, aspects provide for enabling a user to enter a particular trigger input corresponding to an inline command for attaching a content file item to the content file being created or edited. In response to receiving an indication of the trigger input, an inline content attachment system listens for a subsequent text string input, which when received, is handled as search criteria for content file items that satisfy the search criteria. The system searches one or more data sources for content file items that satisfy the search criteria, and provides a scrollable list displaying search results. Upon selection of a content file item result from the list, the selected content file item is attached to the content file being authored.

20 Claims, 12 Drawing Sheets

(56) References Cited

U.S. PATENT DOCUMENTS

| | | | | |
|---|---|---|---|---|
| 2007/0088695 | A1* | 4/2007 | Bleyendaal | G06F 19/324 |
| 2007/0208738 | A1* | 9/2007 | Morgan | G06F 17/271 |
| 2007/0239662 | A1* | 10/2007 | Fontes | G06F 16/951 |
| 2008/0040315 | A1* | 2/2008 | Auerbach | G06F 16/252 |
| 2009/0240564 | A1* | 9/2009 | Boerries | G06Q 30/0255 |
| | | | | 709/204 |
| 2012/0084291 | A1* | 4/2012 | Chung | G06F 16/14 |
| | | | | 707/741 |
| 2013/0144863 | A1* | 6/2013 | Mayer | G06F 16/951 |
| | | | | 707/711 |
| 2014/0324582 | A1 | 10/2014 | Suleman et al. | |
| 2015/0277724 | A1 | 10/2015 | Masterson et al. | |
| 2015/0317388 | A1* | 11/2015 | Roh | G06F 16/334 |
| | | | | 707/722 |
| 2016/0094499 | A1* | 3/2016 | Uraizee | G06F 16/168 |
| | | | | 715/752 |
| 2016/0323217 | A1* | 11/2016 | Subramani | H04L 51/08 |
| 2018/0048600 | A1* | 2/2018 | Duale | H04L 51/063 |
| 2018/0198742 | A1* | 7/2018 | Subramani | H04L 51/08 |

OTHER PUBLICATIONS

Sebastien, "How to attach files and documents to the Mail app on iPhone or iPad", http://www.idownloadblog.com/2016/04/21/how-to-attach-files-documents-mail-iphone-ipad/, Published on: Apr. 21, 2016, 9 pages.

"Beginner, Intermediate, and Advanced Searching in Google Mail", https://it-helpdesk.tetonscience.org/support/solutions/articles/5000711760-beginner-intermediate-and-advanced-searching-in-google-mail, Retrieved on: Apr. 17, 2017, 6 pages.

"Mail Composition—Inline—Attachment—Advantages", http://forums.mozillazine.org/viewtopic.php?f=40&t=888135&sid=5555797238d3eaeb3522d93a2e02a4aa, Published on: Oct. 4, 2008, 3 pages.

Nograpes, "Attaching a file "e;Inline"e; with text", https://www.pcreview.co.uk/threads/attaching-a-file-inline-with-text.766266/, Published on: Jan. 4, 2004, 3 pages.

"International Search Report and Written Opinion Issued in PCT Application No. PCT/US2018/034257", dated Aug. 28, 2018, 11 Pages.

* cited by examiner

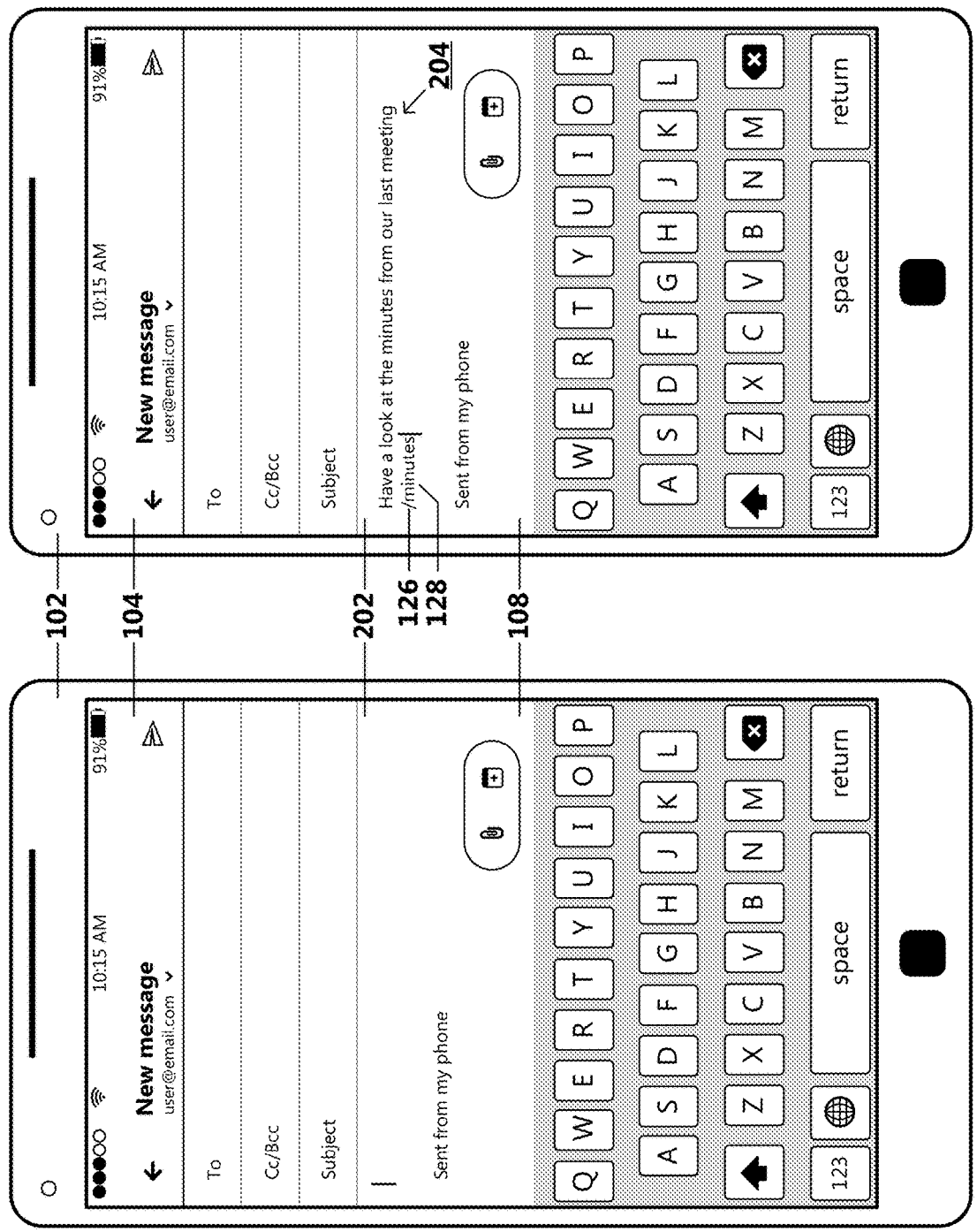

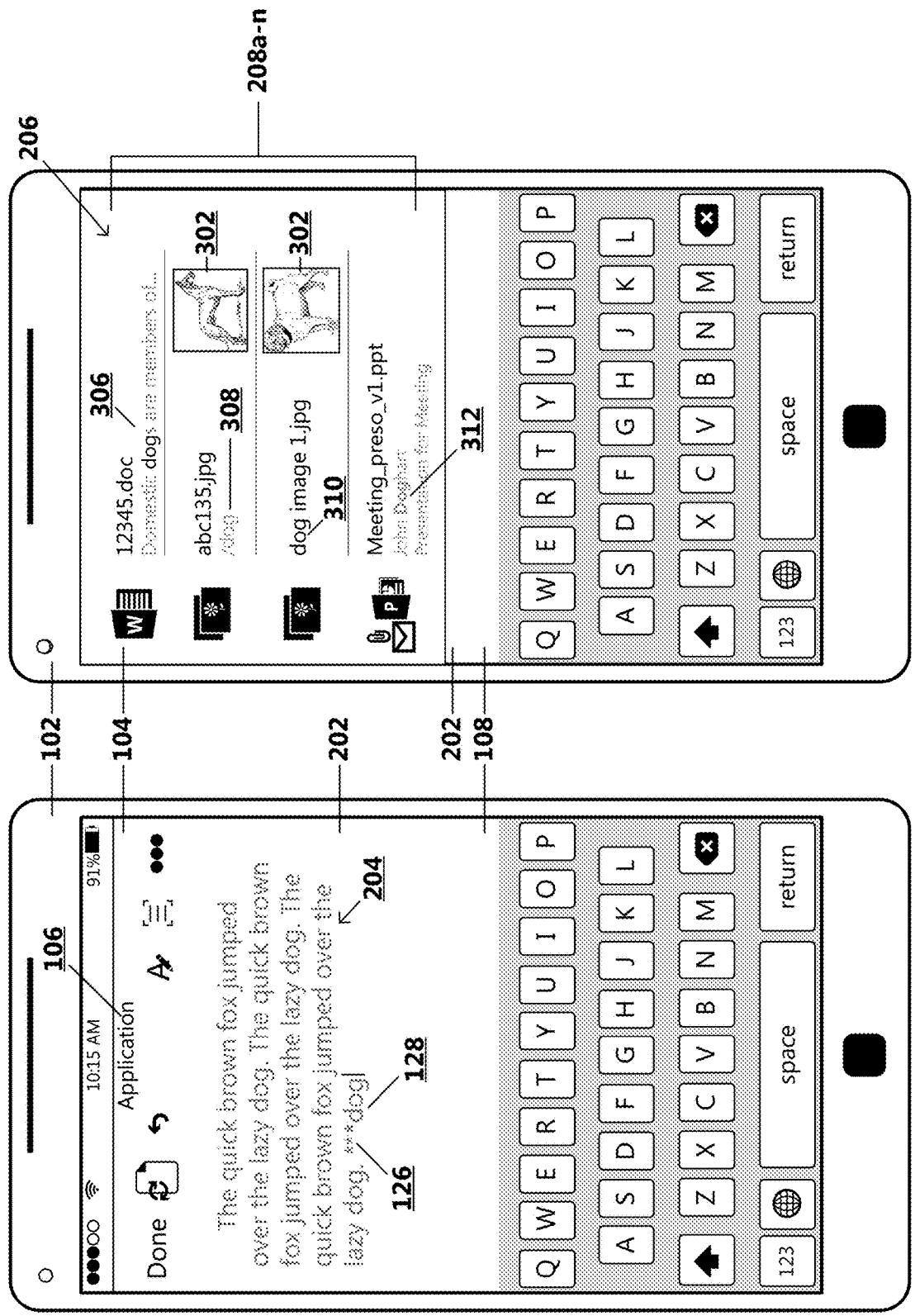

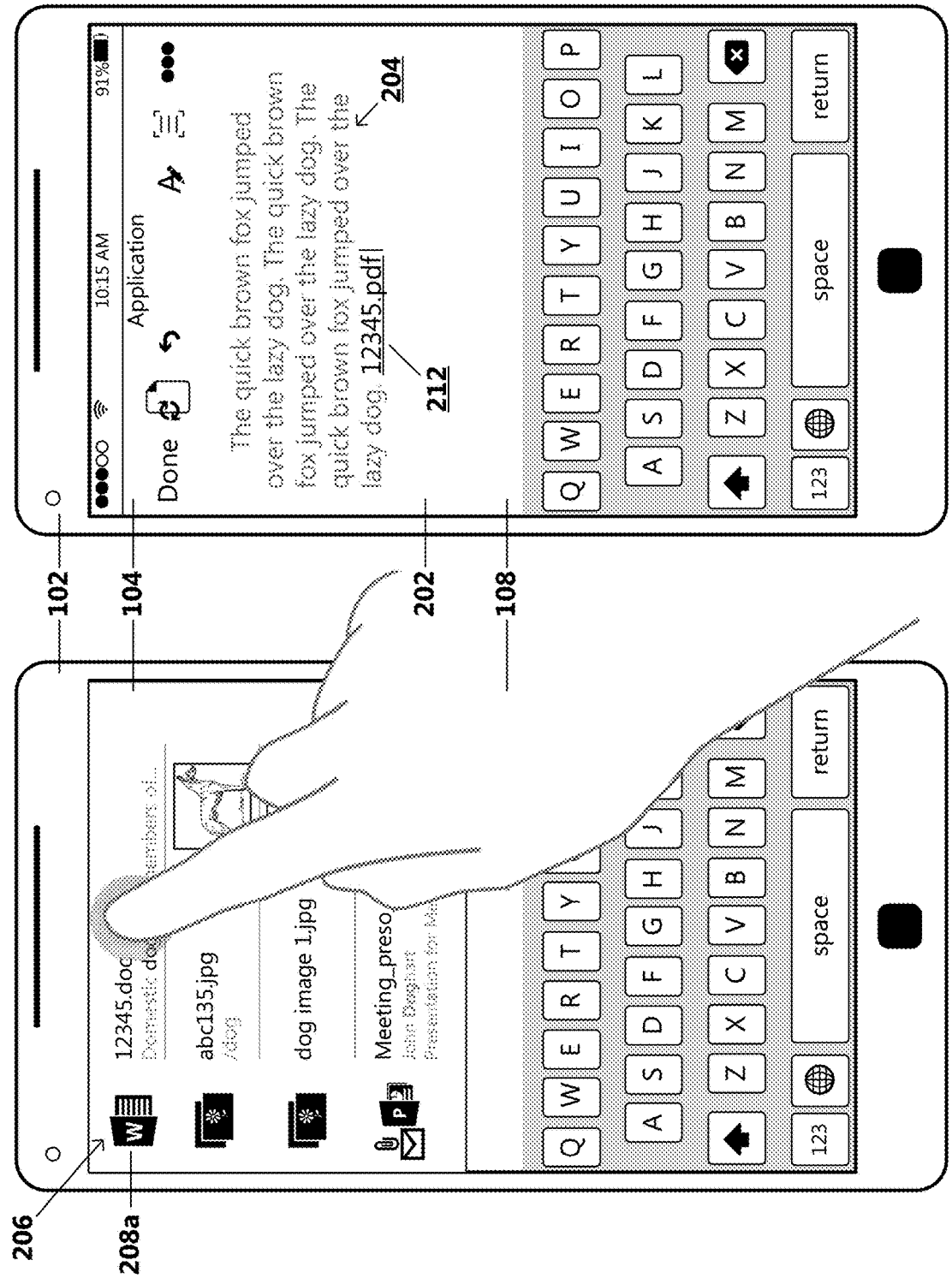

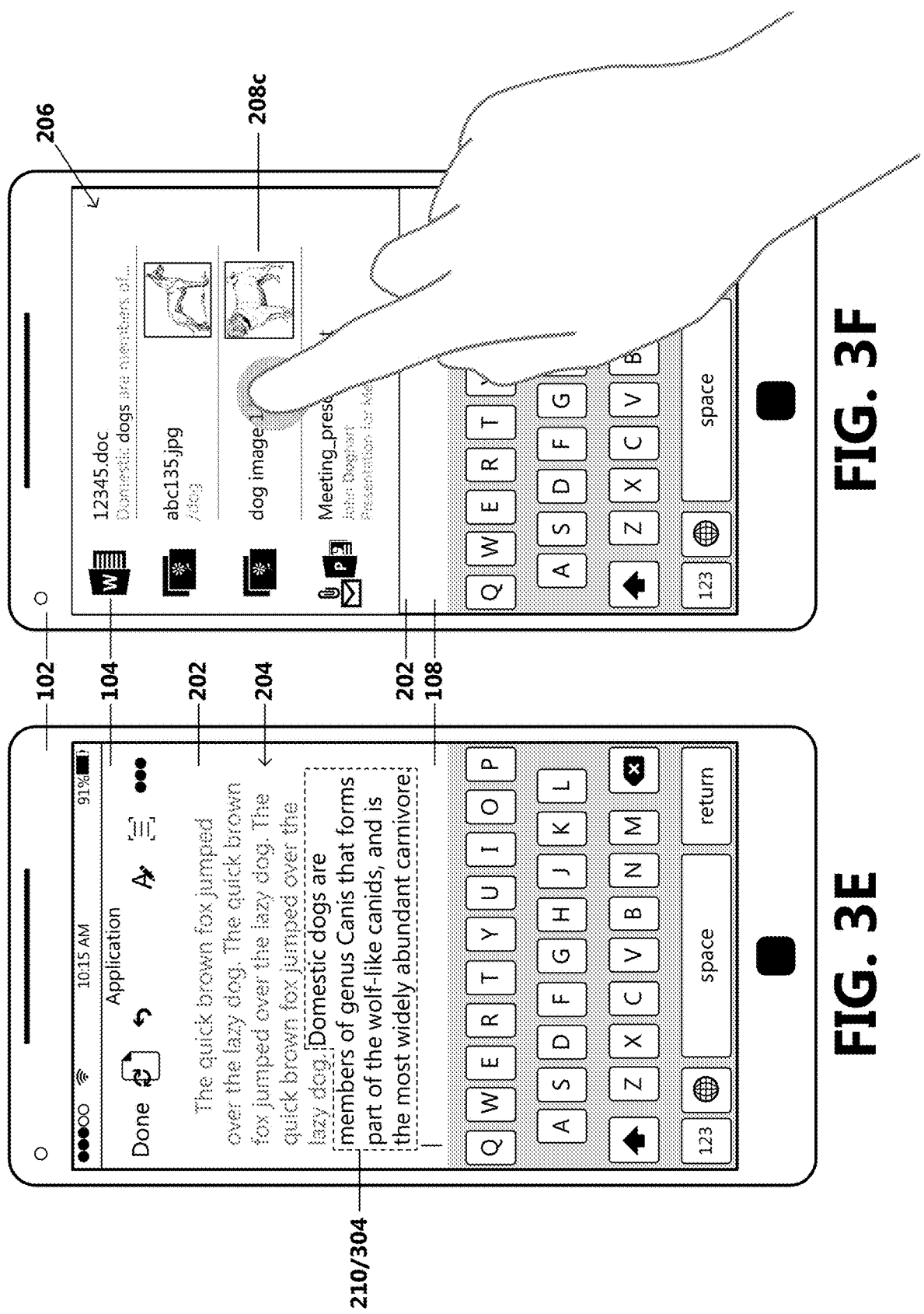

INLINE CONTENT FILE ITEM ATTACHMENT

BACKGROUND

When creating or editing a content file, such as a word processing document, an electronic message, a spreadsheet document, a slide presentation file, a notes document, etc., it is oftentimes desirable to attach one or more other content file items to the content file. For example, it is commonplace to attach an image, video, text document, and the like to an email message. While most modern content authoring applications allow for insertion of content file items into a content file, it oftentimes entails a selection of an attachment command, selection of a file storage location (commonly in a separate window or screen), scrolling through one or more folders to locate a desired content file item to attach, and then a selection of the desired content file item. As can be appreciated, this can be inefficient and distracting to the user, and may interrupt the user's progress on the content file.

Additionally, users are increasingly using small form factor devices, such as mobile phones, tablets, and the like, to author content files. Due in part to the smaller screens, the steps involved in the process of attaching a content file item can be increasingly difficult and inefficient. For example, it can be challenging to select a desired insertion point and to locate a desired content file item to attach. Further, it may not be possible or practical to display contents of a file store or folder simultaneously with the content authoring application. Switching to a separate screen on a small form factor device may be distracting to the user's concentration and cause the user to lose context while authoring the content file.

SUMMARY

This Summary is provided to introduce a selection of concepts in a simplified form that are further described below in the Detailed Description section. This summary is not intended to identify key features or essential features of the claimed subject matter, nor is it intended as an aid in determining the scope of the claimed subject matter.

Aspects are directed to an automated system, computer-implemented method, and computer readable storage device for providing inline attachment of a content file item within a content authoring application. When a user uses a content authoring application to author a content file, aspects provide for enabling the user to enter a particular trigger input corresponding to a command for attaching a content file item to the content file being created or edited in a composition stream of the content file. In response to receiving an indication of the trigger input, an inline content attachment system observes the composition stream for a subsequent text string input, which when received, is handled as search criteria for content file items that satisfy the search criteria. The system searches one or more data sources for content file items that satisfy the search criteria, and provides a display of a scrollable list of search results. In some examples, the list is displayed in a pop up menu in the user interface of the content authoring application. Upon selection of a content file item result from the list, the selected content file item is attached to the content file being authored.

Examples are implemented as a computer process, a computing system, or as an article of manufacture such as a device, computer program product, or computer readable medium. According to an aspect, the computer program product is a computer storage medium readable by a computer system and encoding a computer program of instructions for executing a computer process.

The details of one or more aspects are set forth in the accompanying drawings and description below. Other features and advantages will be apparent from a reading of the following Detailed Description and a review of the associated drawings. It is to be understood that the following Detailed Description is explanatory only and is not restrictive of the claims.

BRIEF DESCRIPTION OF THE DRAWINGS

The accompanying drawings, which are incorporated in and constitute a part of this disclosure, illustrate various aspects. In the drawings:

FIGS. 2A-2D illustrate an example storyboard that shows an example use case using aspects of the inline content attachment system to attach a content file item to an electronic message;

FIGS. 3A-3G illustrate an example storyboard that shows an example use case using aspects of the inline content attachment system to attach a content file item to a text document;

DETAILED DESCRIPTION

Figure 1:
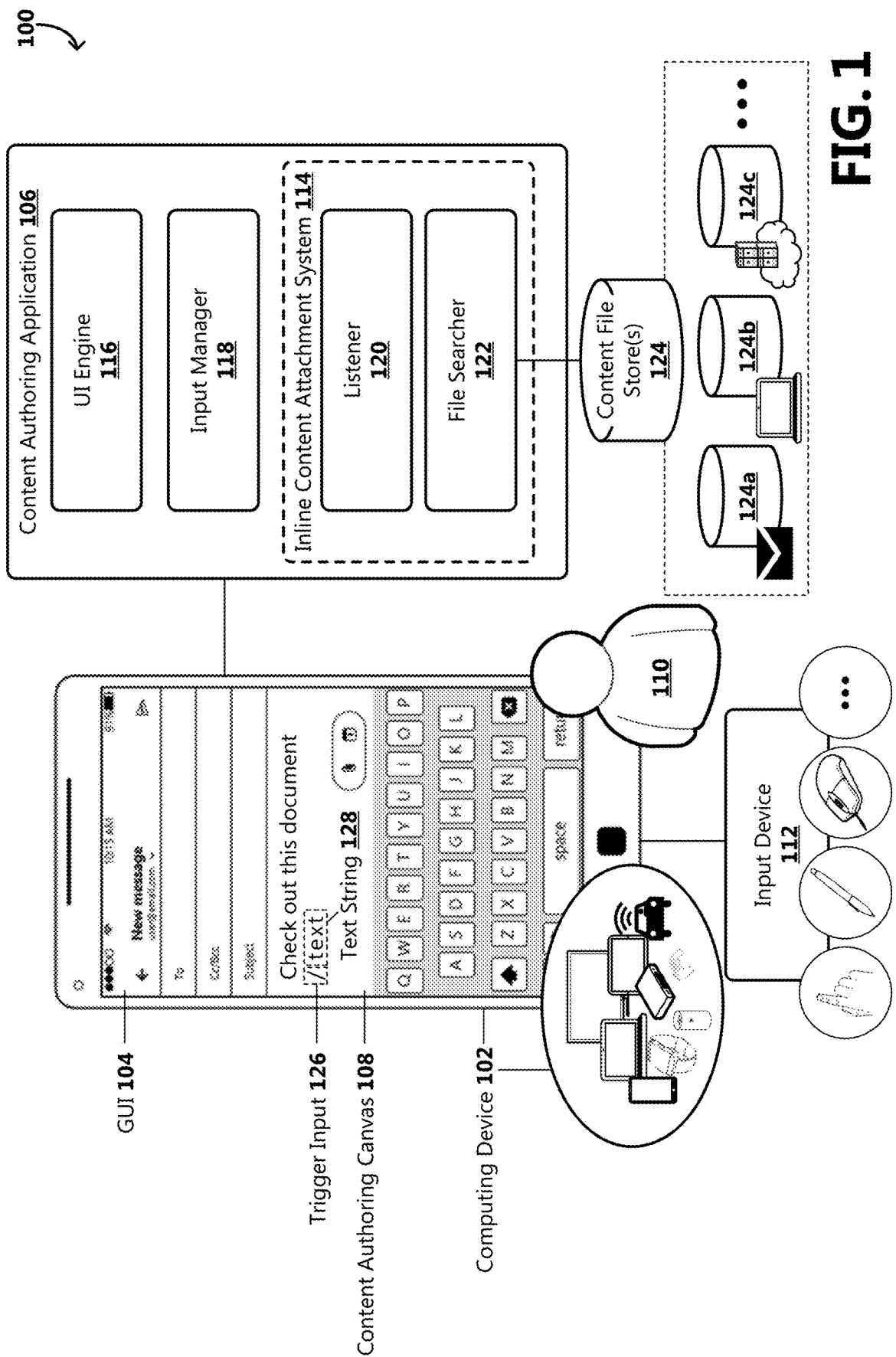
FIG. 1 is a block diagram of an example operating environment including an inline content attachment system for providing inline attachment of a content file item.

Aspects of the present disclosure are directed to a method, system, and computer readable storage device for providing inline attachment of a content file item. Aspects include use of a content authoring application to create a new content file or to edit an existing content file. This disclosure includes various examples that relate to email files. It should be understood, however, that these examples are applicable to other types of content files as well. When a user uses a content authoring application to author a content file (e.g., create a new content file or edit an existing content file), aspects provide for enabling the user to enter a particular trigger input corresponding to an inline command for attaching a content file item to the content file being created or edited. For example, the trigger input operates as a signal to initiate an inline attachment command. In some examples, the trigger input is textual input (e.g., a particular character or sequence of characters) that is entered via keystrokes on a physical or displayed keyboard, spoken input, or via another input method. In other examples, the trigger input is a particular gesture input or device movement corresponding to an inline command for attaching a content file item. In initiating the inline attachment command, an inline content attachment system listens for a subsequent text string input, which when received, is handled as search criteria for content file items that satisfy the search criteria. The system searches one or more data sources for content file items that satisfy the search criteria, and provides a display of a scrollable list of search results. Upon selection of a content file item result from the list, the selected content file item is attached to the content file being authored.

As an example, when composing an email message (i.e., content file), a user enters a composition stream. For example, the user may enter the following textual input in a composition stream of the message: "Attached is the receipt you requested/receipt." As the textual input is received by the content authoring application, it is displayed in the email message canvas. Upon detection of a trigger input, which in this example is the character "/", the inline content attachment system observes the composition stream and listens for a subsequently-entered text string. The inline content attachment system uses the subsequently entered text string or a portion of a subsequently entered text string as search criteria for a content file item. The trigger input "/" is just one example. As should be appreciated, various other characters or sequences of characters can be designated as the trigger input. In some examples, the user is enabled to assign a desired trigger input as an inline command for attaching a content file item to a content file.

Continuing with the above example, the inline content attachment system generates a search query for content file items on one or a plurality of content file storage locations, such as one or more local storage repositories, one or more email inboxes, one or more remote storage repositories, and the like. According to an aspect, the search query is executed on one or more of: content file item titles, metadata, tags, authors, and contents of content file items, titles, senders, and contents of messages associated with content file item attachments.

Content file items that satisfy the search query, which can include content files of various formats (e.g., word processing files, spreadsheet files, slide presentation files, portable document format files, image files, video files, electronic message files), are presented to the user as search results in a scrollable list. The user is enabled to select a search result from the list, and the inline content attachment system attaches the corresponding content file item to the email message. In some examples, the trigger input and/or the entered text string following the trigger input is/are replaced by an embedded link to the selected content file item. For example, after selection of a desired content file item, the user's entry of "/receipt" is replaced by "/ticket-receipt.pdf" or "ticket-receipt.pdf", where "ticket-receipt" is the title of the selected content file item, PDF is the file format of the content file item, and the replacement text is a selectable link to the content file item. In other examples, the trigger input and/or the entered text string following the trigger input is/are replaced by the selected content file item or a portion of the selected content file item. For example, if the selected content file item is an image file, the trigger input and/or the entered text string following the trigger input may be replaced by the selected image.

Among other benefits, the disclosed technology improves user efficiency and increases user interaction performance in attaching a content file item. For example, inline content attachment system bridges a global file search into the composition of the email message, where the user does not have to switch context or search through various folders or document sources for a desired attachment item. Accordingly, users are enabled to more quickly author content files that include a content file item attachment.

FIG. 1 is a block diagram of one example of a system 100 for providing efficient attachment of a content file item to a content file within a content authoring application. System 100 includes a computing device 102, wherein the computing device 102 may be one of various types of computing devices (e.g., a tablet computing device, a desktop computer, a mobile communication device, a laptop computer, a laptop/tablet hybrid computing device, a large screen multi-touch display, a gaming device, a smart television, a wearable device, a connected automobile, a smart home device, or other type of computing device) for executing applications for performing a variety of tasks. The hardware of these computing devices is discussed in greater detail in regard to FIGS. 5, 6A, 6B, and 7.

According to an aspect, the computing device 102 includes at least one content authoring application 106. In some aspects, the content authoring application 106 is an application running on the computing device 102 that is operative to create or edit content files. Additionally, in some aspects, the content authoring application 106 interacts with a server computing device. In some examples, the content authoring application 106 is a browser application operative to generate interactive graphical user interfaces (GUIs 104) based on content served by a remote computing device such as the server computing device or another computing device. According to an example, an extension is installed on the computing device 102 as a plug-in or add-on to the browser application (i.e., content authoring application 106) or is embedded in the browser application.

In one example, the content authoring application 106 is an electronic messaging application, such as an email messaging application, an instant messaging application, or the like, that operates to generate, send, receive, and display electronic messages, such as email messages, instant messages, etc. In another example, the content authoring application 106 is a productivity application (e.g., a word processing application, spreadsheet application, a slide presentation application, a notes taking application) that operates to generate, edit, and display documents (e.g., word processing documents, spreadsheet documents, slide presentation documents, notebook files) that include text. As should be appreciated, content authoring applications 106 are not limited to the above examples. Other types of content authoring applications 106 are possible and are within the scope of the present disclosure.

According to an aspect, the content authoring application 106 includes a user interface (UI) engine 116 illustrative of a software module, system, or device operative to generate a display of content and application functionality controls in a GUI 104. According to examples, the GUI 104 is provided for enabling a user 110 to interact with functionalities of the content authoring application 106 and with content or electronic content files through gestures, manipulation of controls, graphical buttons, visual indicators, and the like. In one example, the GUI 104 includes a content region display area that operates to display one or more content regions from a content file. For example, the content region display area is operative to display an electronic message from an example electronic (message) content file, where the message is an example of a content authoring canvas 108. Other examples of content authoring canvases 108 include pages, slides, spreadsheets, and the like. In some aspects, a content region display area displays a portion of a content file (e.g., electronic message) rather than a whole content file. Alternatively or additionally, a content region display area can display multiple content files (e.g., electronic messages, conversations). In some aspects, the user 110 can interact with and modify the content region that is displayed by adding, removing, repositioning, or otherwise modifying various content elements of the content region display area. For example, content, such as textual content, in the content region display area can be added or modified via user keystrokes on a keypad such as a physical keyboard or virtual (or soft) keyboard, via spoken input, or via other input methods.

With reference still to FIG. 1, the content authoring application 106 further includes an input manager 118 illustrative of a software module, system, or device operative to receive user input. According to examples, the input manager 118 receives user input and communicates the user input in the form of messages. In some examples, the user input includes a physical act or motion performed on or by an input device 112 at a position of a user-controlled cursor (such as a mouse cursor, a touch-point on a touch-screen interface, a focus-point on a motion gesture detection device, or head, eye, or gaze tracking device). Various user interface technologies may be used. For example, user input may be received via hardware input devices, such as mice, keyboards, remote controls, pen/stylus, a camera, and the like. As another example, user input may be received via natural input devices/methods that enable the user 110 to interact with the computing device 102 in a "natural" manner, such as those relying on speech recognition, touch and stylus recognition, gesture recognition both on screen and adjacent to the screen, air gestures, head and eye tracking, voice and speech, vision, touch, hover, gestures, device movement, and machine intelligence.

According to an aspect, the user 110 uses an input device 112 to enter textual input onto a content authoring canvas 108, and the content authoring application 106 receives the textual input resulting in textual content being added to a content file. For example, the textual content comprises a sequence of characters forming one or more words, sentences, paragraphs, etc. Further, the textual content can include various formatting information relating to the text in the textual content such as a font, a size, a color, a style, etc. According to an aspect, in receiving the textual input, the input manager 118 is operative to receive a trigger input 126 corresponding to an inline command for attaching a content file item to the content file being authored, and pass a message to initiate an inline attachment command.

For example, receipt of the trigger input 126 triggers a listener 120 illustrative of a software module, system, or device operative to listen for a string of text (text string 128) that follows the trigger input 126. In response, the listener 120 listens for a text string 128 following the trigger input 126, receives the text string 128 or a portion of the text string 128, and interfaces with a file searcher 122. According to an aspect, the listener 120 provides the received text string 128 to the file searcher 122, which is illustrative of a software module, system, or device, and operative to receive and use the string as search criteria for a content file query on one or various content file stores 124a-n (collectively 124). Via the file searcher 122, which in some examples is an API (Application Programming Interface), the content authoring application 106 is enabled to retrieve a content file that satisfies the search criteria. That is, the file searcher 122 provides an interface to the file searcher 122 while the user 110 composes a content file, and enables the user 110 to attach a content file item to the content file via an inline command without disruption.

In some examples, a content file store 124 is an email mailbox (e.g., inbox), and email messages or content files attached to email messages in the user's mail box can be searched for the text string 128 or a portion of the text string 128. In other examples, a content file store 124 is a data store located on the computing device 102 on which the content authoring application 106 is executing. In other examples, a content file store 124 is a data store residing on a remote server and accessible over a network or combination of networks (e.g., the Internet, wide area networks, local area networks). In other examples, a content file store 124 is a data store associated with the user's email account. In some examples, the user 110 is enabled to specify content file stores 124 that the file searcher 122 has permission to access. According to one aspect, the file searcher 122 enumerates or indexes content in a storage location and performs an advanced query syntax search on the content. According to another aspect, content file stores 124 can store content file items of various types, and the file searcher 122 is operative to receive query results that include content file items of various types.

According to an aspect, in response to the query, the file searcher 122 populates a list with content file items that satisfy the query. In some examples, content file items that satisfy the query search criteria include content items that include the text string 128 or a portion of the text string 128 in a title, within the content of the file item, in metadata or a tag associated with the content file item, in a content file author's name, or in a subject, sender's name, or content of an email message or attachment. In some examples, query results are returned in relevance order, where the result that is most relevant to the query search criteria is the first item in the search return sequence, and the least relevant is the last. A relevance score associated with a query result item can be calculated based on various factors, such as how similar the spelling of a found text string is to the original search criteria, where the text string 128 is found (e.g., in the title of a content file item, in a tag associated with a content file item, in an author's name of a content file item, within content of a content file item), frequency of the search criteria in a content file item, etc. In other examples, query results are categorized according to where the text string 128 is found in association with the query result items.

According to an aspect, the UI engine 116 generates a display of the list or a portion of the list on the screen of the computing device 102. According to one aspect, the list is displayed in a pop up menu within the content authoring application GUI 104. In some examples, the list is scrollable such that if the list includes content items that do not fit on the screen, the user 110 is enabled to scroll through the list to view additional content items. Further, query result content file items in the list are selectable. In response to receiving an indication of a selection of a content file item from the list, the selected content file item is attached to the content file being authored in the content authoring application 106. Aspects of the inline content attachment system 114 bridge a global file search into the composition of a content file, where the user 110 is enabled to attach a content file item to the content file without switching context or having to search through various folders or document stores for a desired attachment item.

Figures 2C, 2D:
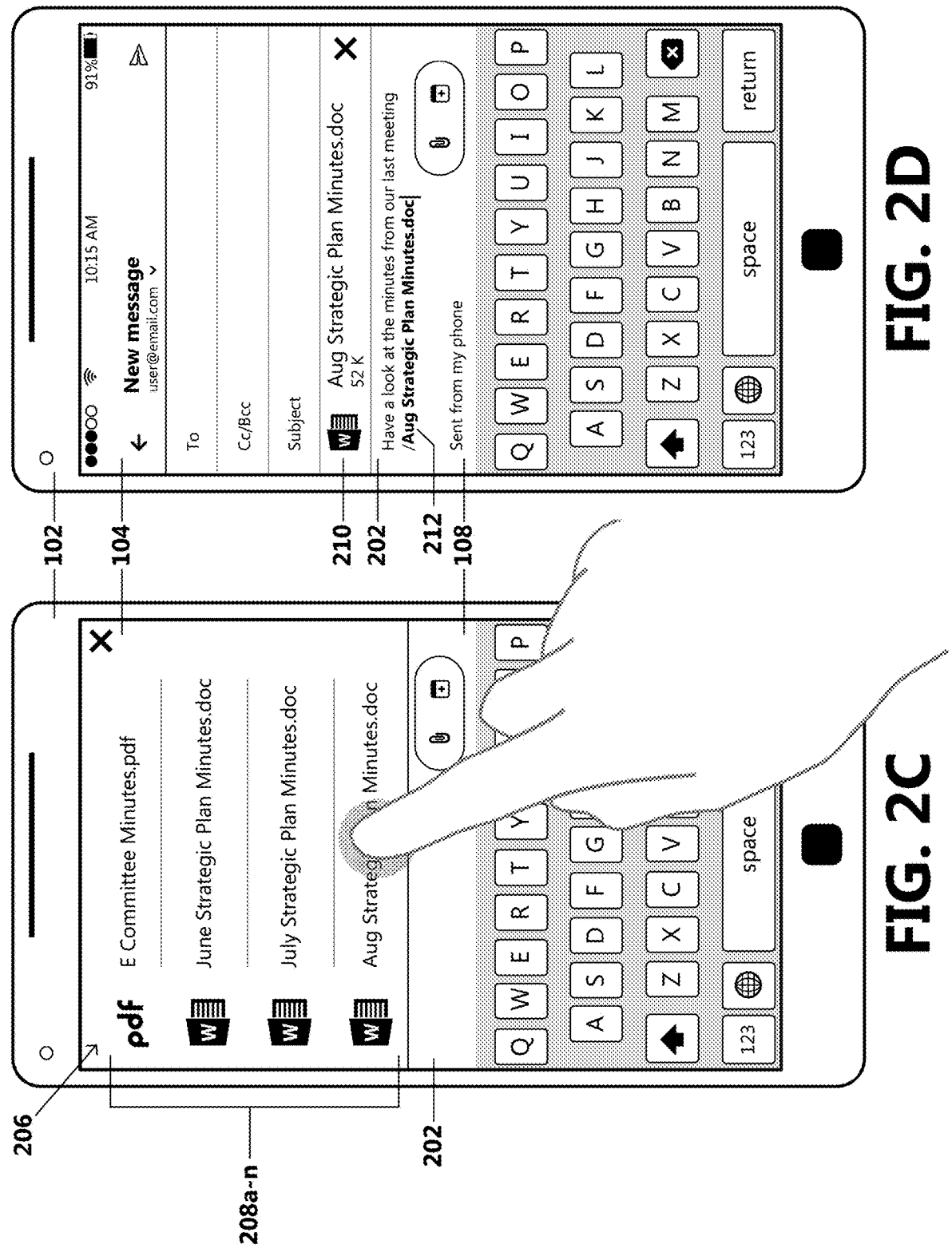

FIGS. 2A-D illustrate an example storyboard that shows an example use case using aspects of the inline content attachment system 114 to attach a content file item to a content file embodied as an electronic message. Although the computing device 102 is embodied as a mobile phone in the illustrated examples, in other examples, the computing device 102 can be embodied as a variety of other computing device types. With reference now to FIG. 2A, in the example use case, the user 110 is using an email messaging application (content authoring application 106) to compose an email message (content file 202). As illustrated in FIG. 2B, in composing the email message, the user 110 enters textual input 204, which is received by the content authoring application 106 and displayed in the email message canvas (content authoring canvas 108).

The textual input 204 includes a trigger input 126 that corresponds to an inline command for attaching a content file item to the content file 202 being authored. In the illustrated example, the trigger input 126 is the character "/". The trigger input "/" is just one example. As should be appreciated, various other characters or sequences of characters can be designated as the trigger input. As described above, responsive to receiving an indication of the trigger input 126, the listener 120 listens for a subsequently-entered text string 128. In the illustrated example, the subsequently-entered text string 128 is "minutes".

In response, the file searcher 122 receives and uses the subsequently entered text string 128 or a portion of a subsequently entered text string 128 as search criteria in a content file query on one or more content file stores 124. For example, the one or more content file stores 124 can include a file storage account associated with the user's email account, the user's email mailbox, a local repository, a remote repository, etc. With reference now to FIG. 2C, query results 208a-n (collectively 208) that satisfy the search criteria are populated into a list 206 that is displayed in the GUI 104. According to an aspect, the list 206 is displayed in the GUI 104 of the content authoring application 106. That is, aspects of the inline content attachment system 114 allow the user 110 to provide an attachment command and search criteria inline while authoring a content file 202 without the disruption of selecting an attachment command and an opening a separate search menu that requires the user 110 to navigate through various content file stores 124 or folders for locating a content file item for attachment.

Query results 208 can include content files of various formats (e.g., word processing files, spreadsheet files, slide presentation files, portable document format files, image files, video files, electronic message files). Further, the query results 208 included in the list 206 can include a variety of information. For example, in some examples, titles of the content file items are provided. In some examples, icons designating the content file item types are provided. In some examples, information associated with the content file items that satisfy the query search criteria are provided (e.g., the text string 128 or a portion of the text string 128 in a title, within the content of the file item, in metadata or a tag associated with the content file item, in a content file author's name, or in a subject, sender's name, or content of an email message or attachment). In some examples, the query results 208 are listed in relevance order based on a calculated relevance score. The user 110 is enabled to scroll through the list 206 and select a query result 208 corresponding to a content file item for attachment to the content file 202 being authored (e.g., the email message).

As illustrated in FIG. 2C, the user 110 selects a query result 208 from the list 206. Responsive to the selection, the content authoring application 106 attaches the selected content file item (i.e., the selected query result 208) to the content file 202 being authored. With reference now to FIG. 2D, the GUI 104 is updated to display the attachment 210. In some examples, the trigger input 126 and/or the subsequently entered text string 128 following the trigger input is/are replaced by a link 212 to the attached content file item in the composition stream. For example, the user's entry of "minutes" is replaced by "Aug Strategic Plan Minutes.doc", where "Aug Strategic Plan Minutes" is the title of the attachment 210, "doc" is the file format of the attached content file item, and the replacement text is a selectable link to the content file item. The user 110 may then select to send the email message (content item 202). Accordingly, the attachment 210 is sent with the email message to the intended recipient or recipients.

Figure 3G:
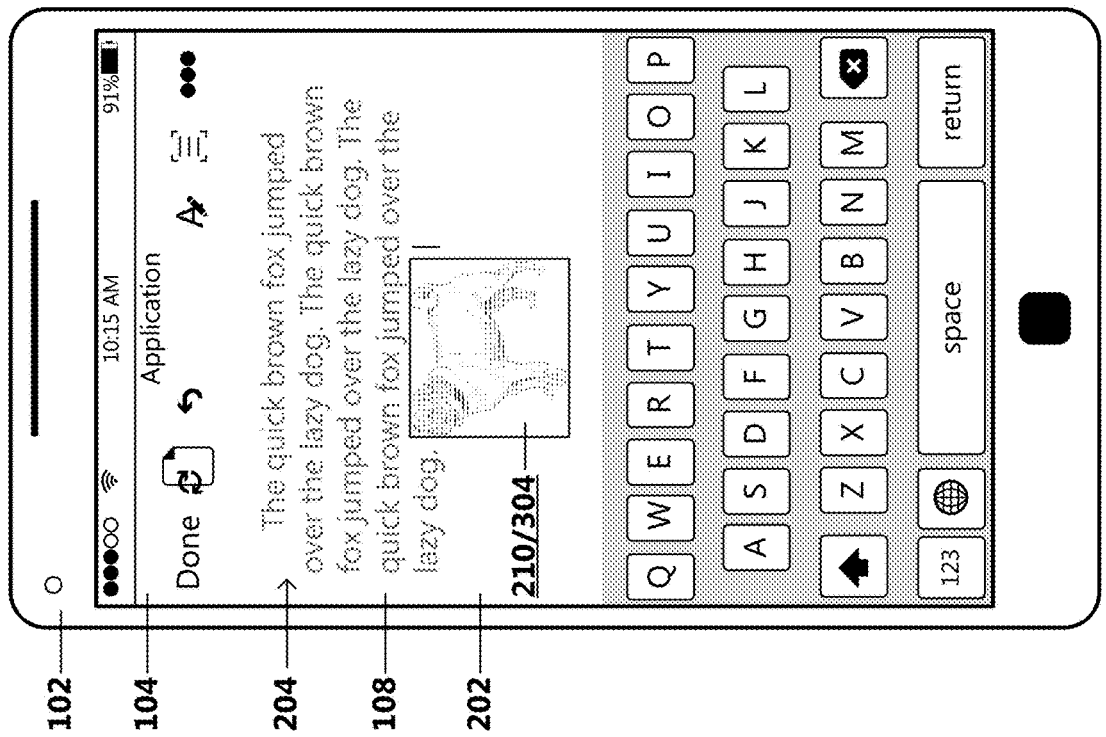

FIGS. 3A-3G illustrate an example storyboard that shows an example use case using aspects of the inline content attachment system 114 to attach a content file item to a content file 202 embodied as a text document. With reference now to FIG. 3A, in the example use case, the user 110 is composing a text document using a content authoring application 106, such as a word processing application. Similarly as in the previous example, as the user 110 enters textual input 204, the content authoring application 106 receives and displays the textual input on the page (content authoring canvas 108).

In the illustrated example, the textual input 204 includes a trigger input 126 that corresponds to an inline command for attaching a content file item to the content file 202 being authored. In the illustrated example, the trigger input 126 is the character sequence "*". The trigger input "*" is just one example. As should be appreciated, various other characters or sequences of characters can be designated as the trigger input. In an example, the user 110 designates the trigger input 126. As described above, responsive to receiving an indication of the trigger input 126, the listener 120 listens for a subsequently-entered text string 128. In the illustrated example, the subsequently-entered text string 128 is "dog".

In response, the file searcher 122 receives and uses "dog" or a portion of "dog" as search criteria in a content file query on one or more content file stores 124. With reference now to FIG. 3B, query results 208 of various file types that satisfy the search criteria are populated into a list 206 that is displayed in the GUI 104. As illustrated, in some examples, thumbnails 302 or preview images representative of one or more of the query result content file items are provided and displayed in association with the query results 208 included in the list 206. As mentioned above, content file items that satisfy the query search criteria can include content items that include the text string 128 or a portion of the text string in a title 310, within the content 306 of the file item, in metadata 308 or a tag associated with the content file item, in a content file author's name, or in a subject, sender's name 312, or content of an email message or attachment.

With reference now to FIG. 3C, the example use case continues with the user 110 selecting a query result 208a from the list 206, which in this example is a word processing document. Responsive to the selection and with reference now to FIG. 3D, the content file item associated with the selected query result 208a is attached to the document. In some examples and as illustrated in FIG. 3D, a content file item is attached as an embedded link 212 to the selected content file item. In other examples and as illustrated in FIG. 3E, content or a portion of content of a content file item associated with a selected query result 208 is attached as an insertion 304 into the content item 202 being composed. For example, the insertion 304 of content file item content can replace the trigger entry 126 and/or text string 128 used as search criteria for a content file item attachment.

With reference now to FIG. 3F, the user 110 is shown selecting another query result 208c from the list 206. In this example, the user 110 selects an image file. Responsive to the selection and with reference now to FIG. 3G, the content file item associated with the selected query result 208c is attached to the document. In some examples and as illustrated in FIG. 3G, a content file item is attached as an insertion 304 into the content file 202 being composed. For example, the image file associated with the selected query result 208c can be inserted onto the page (content authoring canvas 108) in the composition stream of the content file (e.g., inline with entered textual content 204 at the location where the trigger input 126 is received). As should be appreciated, the above examples are nonlimiting examples. Other use case scenarios are possible and are within the scope of the present disclosure.

Figure 4:
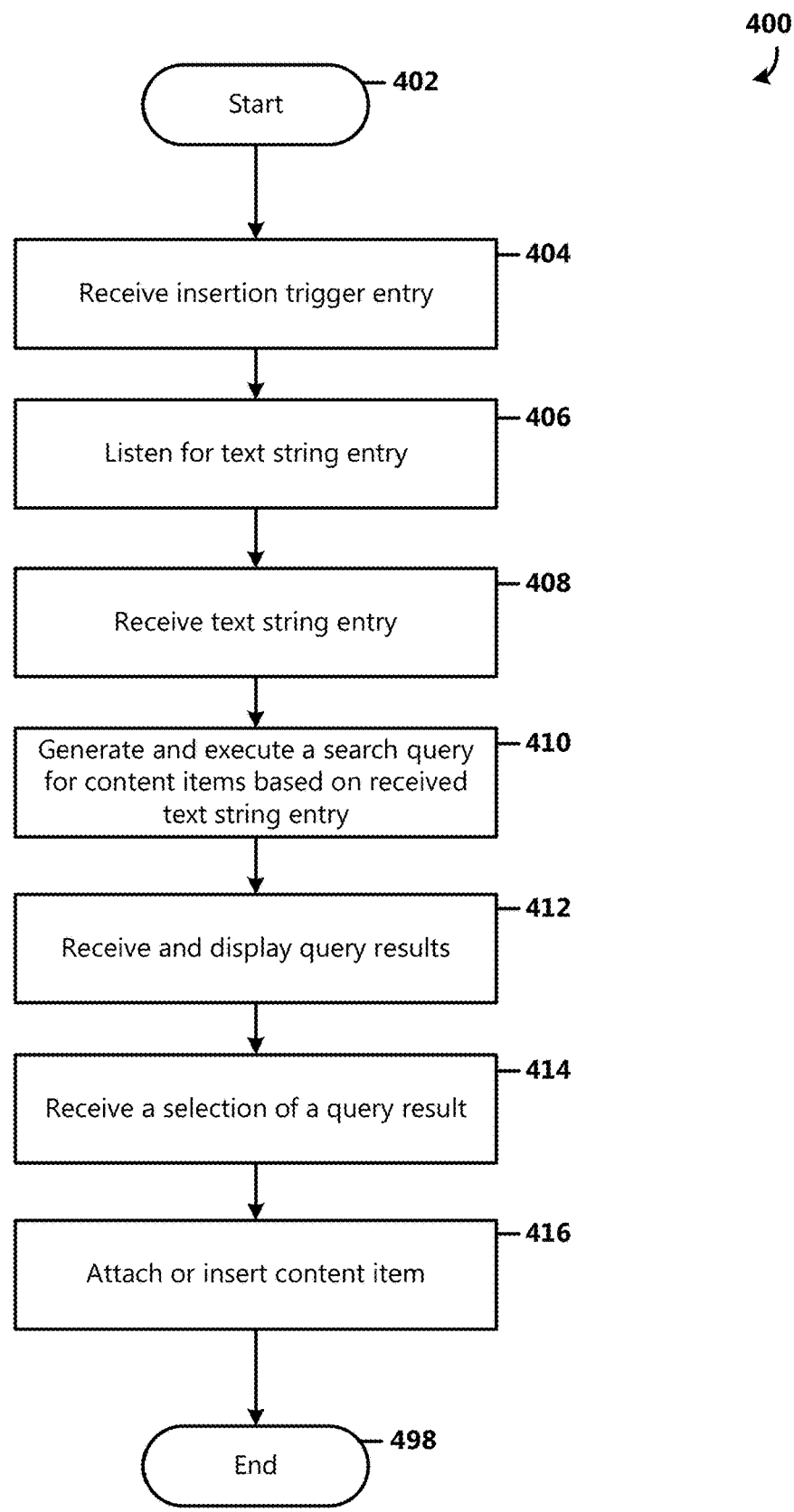
FIG. 4 is a flow chart showing general stages involved in an example method for providing inline attachment of a content file item.

FIG. 4 is a flow chart showing general stages involved in one example method 400 for providing inline attachment of a content file item. As an example, the method 400 is executed by a component of an exemplary system such as the system 100 illustrated in FIG. 1. For example, the method 400 may be performed by one or more components of the content authoring application 106 and/or one or more components of the inline content attachment system 114 to provide inline attachment of a content file item responsive to an inline command entered by a user 110. In examples, the method 400 is executed on a computing device 102 comprising at least one processor configured to store and execute operations, programs, or instructions. The method 400 starts at OPERATION 402, and proceeds to OPERATION 404, where a trigger input 126 is received within a content authoring canvas 108. As described above, the trigger input 126 comprises one or a sequence of characters input by the user 110 through keystrokes or other text entry methods. In aspects, the trigger input 126 is displayed in the content authoring canvas 108.

The method 400 continues to OPERATION 406, where in response to receiving an indication of the trigger input 126, the listener 120 listens for a text string 128 following the trigger input 126, and at OPERATION 408, the listener 120 receives the text string 128 or a portion of the text string 128.

The method 400 proceeds to OPERATION 410, where the listener 120 provides an interface to the file searcher 122. For example, the listener 120 interfaces the file searcher 122 and provides the received text string 128 to the file searcher 122 as search criteria for a content file query on one or various content file stores 124. Further, the file searcher 122 performs a query on one or various content file stores 124 or on one or more content file store indexes for content file items that satisfy the search criteria. The one or various content file stores 124 can include one or more of: an email mailbox (e.g., inbox); a data store located on the computing device 102 on which the content authoring application 106 is executing; a data store residing on a remote server and accessible over a network or combination of networks (e.g., the Internet, wide area networks, local area networks); a data store associated with the user's email account; etc. In some examples, the user 110 is enabled to specify content file stores 124 that the file searcher 122 has permission to access.

The method 400 proceeds to OPERATION 412, where in response to the query, the file searcher 122 populates a list 206 with query results 208 of content file items that satisfy the query. In some examples, content file items that satisfy the query search criteria include content items that include the text string 128 or a portion of the text string 128 in a title 310, within the content 306 of the file item, in metadata 308 or a tag associated with the content file item, in a content file author's name, or in a subject, sender's name 312, or content of an email message or attachment. In some examples, the query results 208 are displayed in relevance order, where the result that is most relevant to the query search criteria is the first item in the search return sequence, and the least relevant is the last. In some examples, the file searcher 122 calculates a relevance score for the query results 208.

At OPERATION 414, a user selection of a query result 208 from the list 206 is received, and at OPERATION 416, the content file item associated with the selected query result 208 is attached to the content file 202 being composed in the content authoring application 106. In some examples, the attachment 210 is copied and provided along with a content item 202 (e.g., an electronic message) to a recipient or stored in a content file store 124. In other examples, the attachment 210 is inserted into the content item 202. In other examples, the attachment 210 is provided as a link 212 to the content file item associated with the selected query result 208. The method 400 ends at OPERATION 498.

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 5:
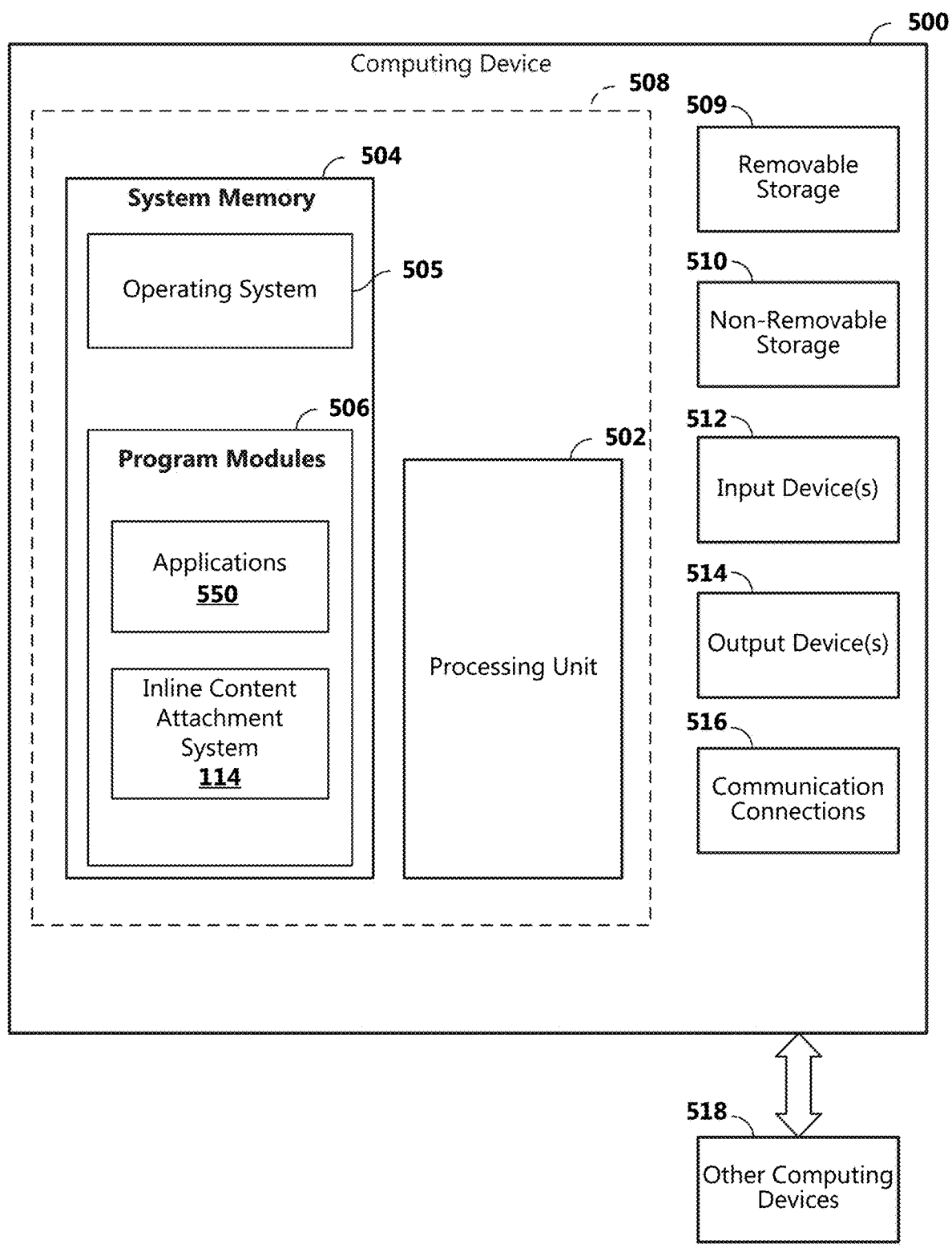
FIG. 5 is a block diagram illustrating example physical components of a computing device.
Figure 6A:
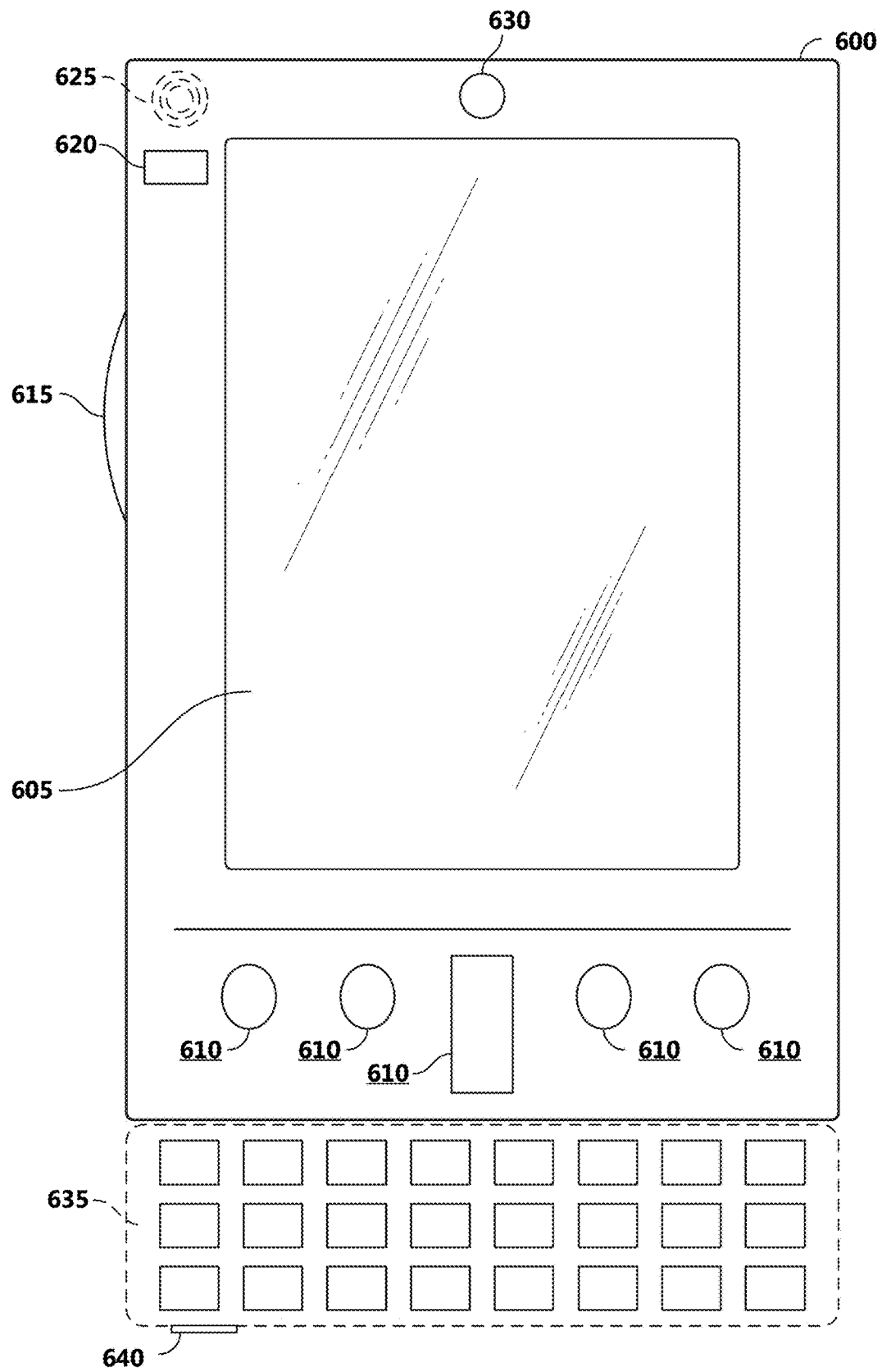
FIGS. 6A and 6B are block diagrams of a mobile computing device.
Figure 6B:
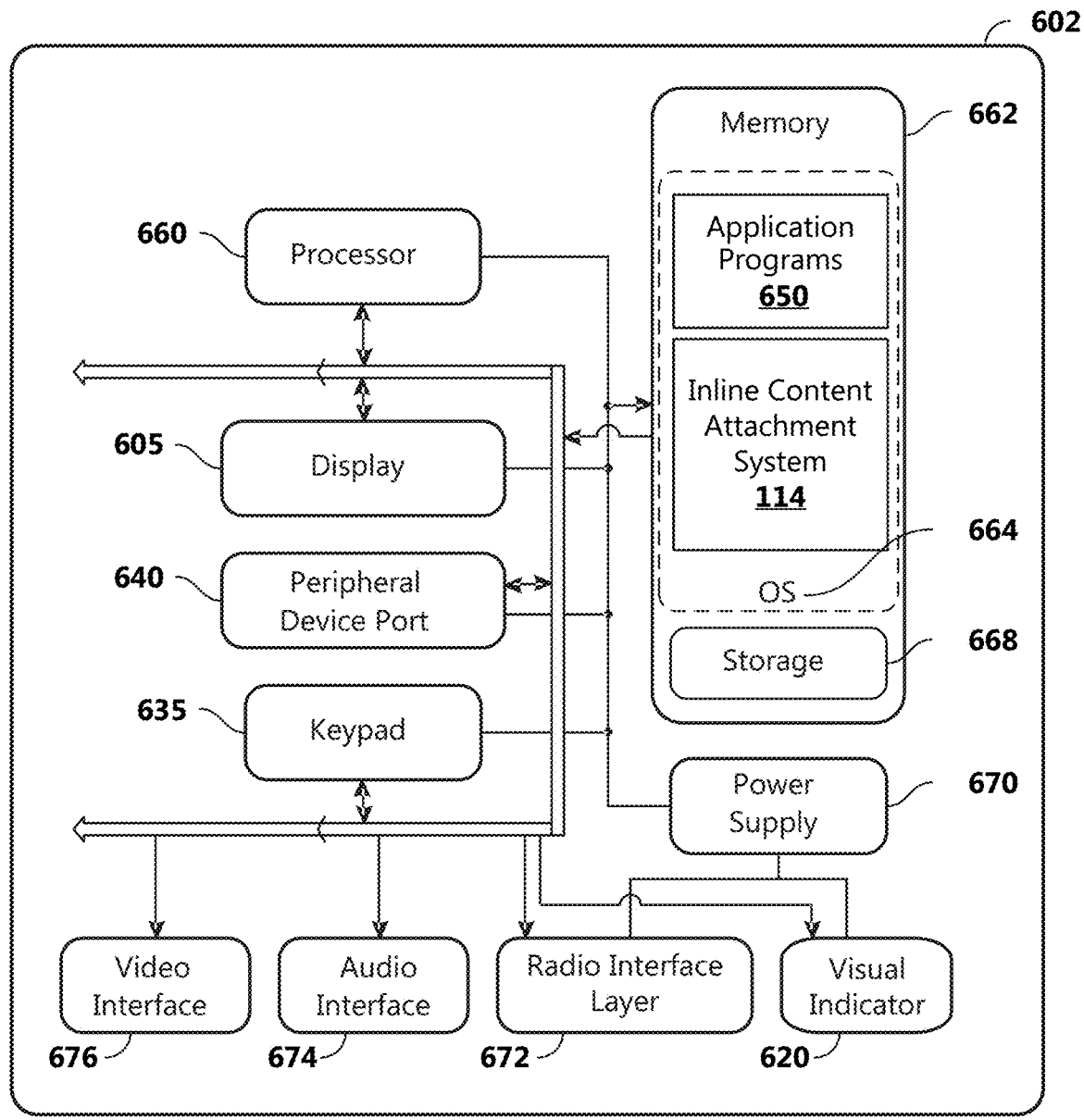
Figure 7:
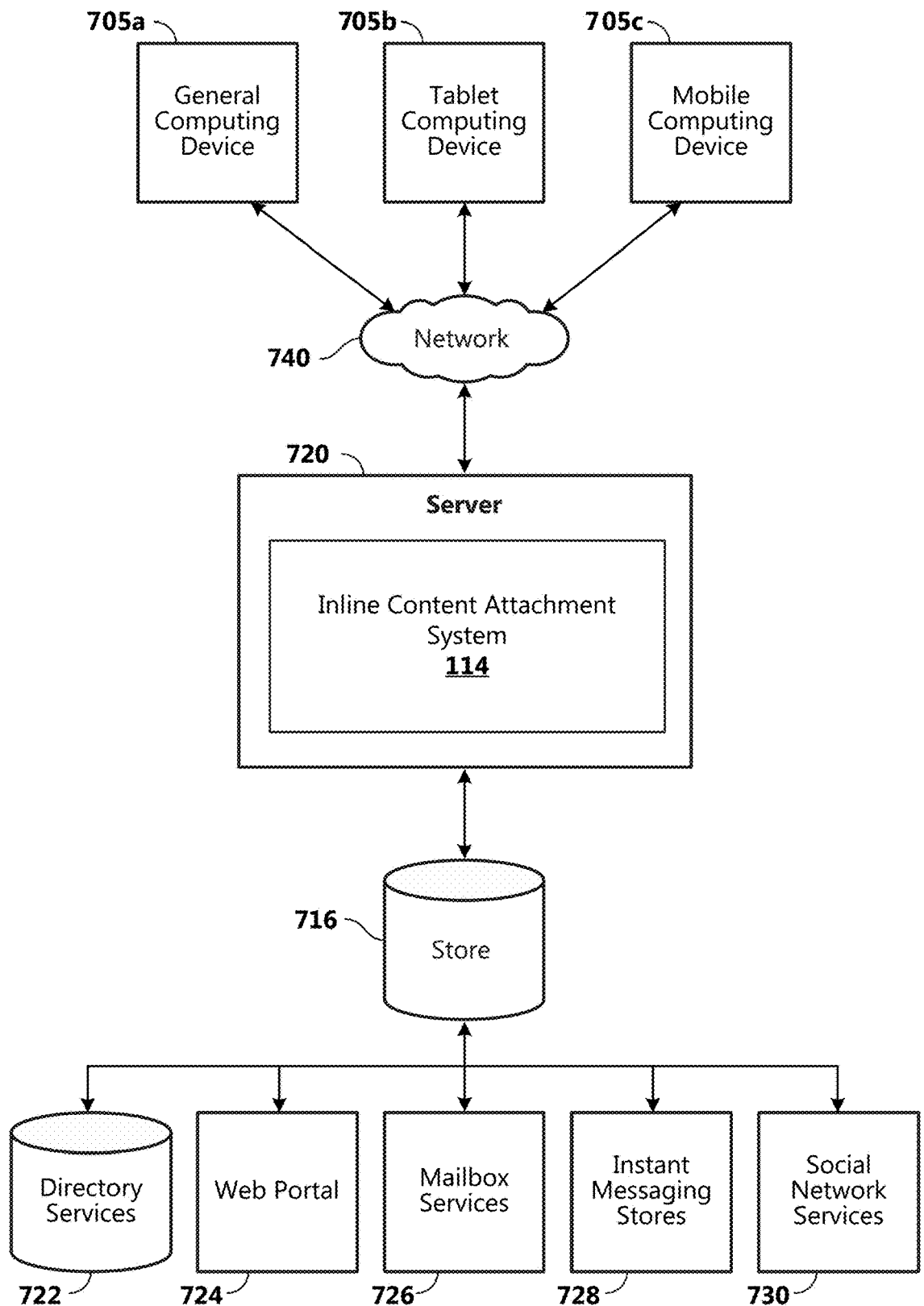
FIG. 7 is a block diagram of a distributed computing system.

FIGS. 5-7 and the associated descriptions provide a discussion of a variety of operating environments in which examples are practiced. However, the devices and systems illustrated and discussed with respect to FIGS. 5-7 are for purposes of example and illustration and are not limiting of a vast number of computing device configurations that are used for practicing aspects, described herein.

FIG. 5 is a block diagram illustrating physical components (i.e., hardware) of a computing device 500 with which examples of the present disclosure may be practiced. In a basic configuration, the computing device 500 includes at least one processing unit 502 and a system memory 504. According to an aspect, depending on the configuration and type of computing device, the system memory 504 comprises, but is not limited to, volatile storage (e.g., random access memory), non-volatile storage (e.g., read-only memory), flash memory, or any combination of such memories. According to an aspect, the system memory 504 includes an operating system 505 and one or more program modules 506 suitable for running software applications 550. According to an aspect, the system memory 504 includes the one or more components of the inline content attachment system 114. The operating system 505, for example, is suitable for controlling the operation of the computing device 500. Furthermore, aspects are practiced in conjunction with a graphics library, other operating systems, or any other application program, and are not limited to any particular application or system. This basic configuration is illustrated in FIG. 5 by those components within a dashed line 508. According to an aspect, the computing device 500 has additional features or functionality. For example, according to an aspect, the computing device 500 includes additional data storage devices (removable and/or non-removable) such as, for example, magnetic disks, optical disks, or tape. Such additional storage is illustrated in FIG. 5 by a removable storage device 509 and a non-removable storage device 510.

As stated above, according to an aspect, a number of program modules and data files are stored in the system memory 504. While executing on the processing unit 502, the program modules 506 (e.g., one or more components of the inline content attachment system 114) perform processes including, but not limited to, one or more of the stages of the method 400 illustrated in FIG. 4. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, aspects are practiced in an electrical circuit comprising discrete electronic elements, packaged or integrated electronic chips containing logic gates, a circuit using a microprocessor, or on a single chip containing electronic elements or microprocessors. For example, aspects are practiced via a system-on-a-chip (SOC) where each or many of the components illustrated in FIG. 5 are integrated onto a single integrated circuit. According to an aspect, such an SOC device includes one or more processing units, graphics units, communications units, system virtualization units and various application functionality all of which are integrated (or "burned") onto the chip substrate as a single integrated circuit. When operating via an SOC, the functionality, described herein, is operated via application-specific logic integrated with other components of the computing device 500 on the single integrated circuit (chip). According to an aspect, aspects of the present disclosure are practiced using other technologies capable of performing logical operations such as, for example, AND, OR, and NOT, including but not limited to mechanical, optical, fluidic, and quantum technologies. In addition, aspects are practiced within a general purpose computer or in any other circuits or systems.

According to an aspect, the computing device 500 has one or more input device(s) 512 such as a keyboard, a mouse, a pen, a sound input device, a touch input device, etc. The output device(s) 514 such as a display, speakers, a printer, etc. are also included according to an aspect. The aforementioned devices are examples and others may be used. According to an aspect, the computing device 500 includes one or more communication connections 516 allowing communications with other computing devices 518. Examples of suitable communication connections 516 include, but are not limited to, radio frequency (RF) transmitter, receiver, and/or transceiver circuitry; universal serial bus (USB), parallel, and/or serial ports.

The term computer readable media as used herein include computer storage media. Computer storage media include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (i.e., memory storage.) According to an aspect, computer storage media include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. According to an aspect, any such computer storage medium is part of the computing device 500. Computer storage media do not include a carrier wave or other propagated data signal.

According to an aspect, communication media are embodied by computer readable instructions, data structures, program modules, or other data in a modulated data signal, such as a carrier wave or other transport mechanism, and includes any information delivery medium. According to an aspect, the term "modulated data signal" describes a signal that has one or more characteristics set or changed in such a manner as to encode information in the signal. By way of example, and not limitation, communication media include wired media such as a wired network or direct-wired connection, and wireless media such as acoustic, radio frequency (RF), infrared, and other wireless media.

FIGS. 6A and 6B illustrate a mobile computing device 600, for example, a mobile telephone, a smart phone, a tablet personal computer, a laptop computer, and the like, with which aspects may be practiced. With reference to FIG. 6A, an example of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. According to an aspect, the display 605 of the mobile computing device 600 functions as an input device (e.g., a touch screen display). If included, an optional side input element 615 allows further user input. According to an aspect, the side input element 615 is a rotary switch, a button, or any other type of manual input element. In alternative examples, mobile computing device 600 incorporates more or less input elements. For example, the display 605 may not be a touch screen in some examples. In alternative examples, the mobile computing device 600 is a portable phone system, such as a cellular phone. According to an aspect, the mobile computing device 600 includes an optional keypad 635. According to an aspect, the optional keypad 635 is a physical keypad. According to another aspect, the optional keypad 635 is a "soft" keypad generated on the touch screen display. In various aspects, the output elements include the display 605 for showing a graphical user interface (GUI), a visual indicator 620 (e.g., a light emitting diode), and/or an audio transducer 625 (e.g., a speaker). In some examples, the mobile computing device 600 incorporates a vibration transducer for providing the user with tactile feedback. In yet another example, the mobile computing device 600 incorporates input and/or output ports, such as an audio input (e.g., a microphone jack), an audio output (e.g., a headphone jack), and a video output (e.g., a HDMI port) for sending signals to or receiving signals from an external device. In yet another example, the mobile computing device 600 incorporates peripheral device port 640, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one example of a mobile computing device. That is, the mobile computing device 600 incorporates a system (i.e., an architecture) 602 to implement some examples. In one example, the system 602 is implemented as a "smart phone" capable of running one or more applications (e.g., browser, e-mail, calendaring, contact managers, messaging clients, games, and media clients/players). In some examples, the system 602 is integrated as a computing device, such as an integrated personal digital assistant (PDA) and wireless phone.

According to an aspect, one or more application programs 650 are loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. According to an aspect, one or more components of the inline content attachment system 114 is loaded into memory 662. The system 602 also includes a non-volatile storage area 668 within the memory 662. The non-volatile storage area 668 is used to store persistent information that should not be lost if the system 602 is powered down. The application programs 650 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600.

According to an aspect, the system 602 has a power supply 670, which is implemented as one or more batteries. According to an aspect, the power supply 670 further includes an external power source, such as an AC adapter or a powered docking cradle that supplements or recharges the batteries.

According to an aspect, the system 602 includes a radio 672 that performs the function of transmitting and receiving radio frequency communications. The radio 672 facilitates wireless connectivity between the system 602 and the "outside world," via a communications carrier or service provider. Transmissions to and from the radio 672 are conducted under control of the operating system 664. In other words, communications received by the radio 672 may be disseminated to the application programs 650 via the operating system 664, and vice versa.

According to an aspect, the visual indicator 620 is used to provide visual notifications and/or an audio interface 674 is used for producing audible notifications via the audio transducer 625. In the illustrated example, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. According to an aspect, the system 602 further includes a video interface 676 that enables an operation of an on-board camera 630 to record still images, video stream, and the like.

According to an aspect, a mobile computing device 600 implementing the system 602 has additional features or functionality. For example, the mobile computing device 600 includes additional data storage devices (removable and/or non-removable) such as, magnetic disks, optical disks, or tape. Such additional storage is illustrated in FIG. 6B by the non-volatile storage area 668.

According to an aspect, data/information generated or captured by the mobile computing device 600 and stored via the system 602 is stored locally on the mobile computing device 600, as described above. According to another aspect, the data is stored on any number of storage media that are accessible by the device via the radio 672 or via a wired connection between the mobile computing device 600 and a separate computing device associated with the mobile computing device 600, for example, a server computer in a distributed computing network, such as the Internet. As should be appreciated such data/information is accessible via the mobile computing device 600 via the radio 672 or via a distributed computing network. Similarly, according to an aspect, such data/information is readily transferred between computing devices for storage and use according to well-known data/information transfer and storage means, including electronic mail and collaborative data/information sharing systems.

FIG. 7 illustrates one example of the architecture of a system for providing inline attachment of a content file item in a content file 202 as described above. Content developed, interacted with, or edited in association with the inline content attachment system 114 is enabled to be stored in different communication channels or other storage types. For example, various documents may be stored using a directory service 722, a web portal 724, a mailbox service 726, an instant messaging store 728, or a social networking site 730. The inline content attachment system 114 is operative to use any of these types of systems or the like for providing inline attachment of a content file item in a content file 202, as described herein. According to an aspect, a server 720 provides one or more components of the inline content attachment system 114 to clients 705*a,b,c*. As one example, the server 720 is a web server providing the inline content attachment system 114 over the web. The server 720 provides the inline content attachment system 114 over the web to clients 705 through a network 740. By way of example, the client computing device is implemented and embodied in a personal computer 705*a*, a tablet computing device 705*b* or a mobile computing device 705*c* (e.g., a smart phone), or other computing device. Any of these examples of the client computing device are operable to obtain content from the store 716.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

We claim:

1. A system for attaching a content file item to a composition stream, comprising:
    at least one processing device; and
    at least one computer readable data storage medium storing instructions that, when executed by the at least one processing device, are operative to:
        detect a trigger input in a composition stream being authored or edited;
        responsive to detection of the trigger input, receive a text search criteria in the composition stream subsequent to the trigger input;
        responsive to receiving the text search criteria in the composition stream, query one or more content file stores for content file items satisfying the text search criteria, wherein the query is executed on one or more of titles, tags, authors, and contents of content file items within the one or more content file stores;
        generate and display a list of query results of content file items that satisfy the text search criteria, wherein the content file items are ordered in the list based on a similarity of a text string found in the content file items to the text search criteria and a location where the text string is found, the location being one or more of the titles, the tags, the authors, and the contents of the content file items;
        receive a selection of a content file item from the list of query results, wherein the text string is found in at least the contents of the selected content file item; and
        in response to receiving the selection, insert, in the composition stream, a portion of the contents of the selected content file item that includes the text string.

2. The system of claim 1, wherein the trigger input comprises one of:
    a character or sequence of characters;
    a voice command;
    a gesture; and
    a device movement.

3. The system of claim 1, wherein the text search criteria comprises a text string entered subsequently to the trigger input.

4. The system of claim 1, wherein in querying the one or more content file stores, the system is operative to further execute the query on one or more of:
    a subject of an email message to which the content file item is attached;
    a sender's name of an email message to which the content file item is attached; and
    content of an email message to which the content file item is attached.

5. The system of claim 1, wherein in identifying content file items that satisfy the text search criteria, the system is operative to calculate a relevance score based on at least the similarity of the text string found in the content file items to the text search criteria and the location where the text string is found.

6. The system of claim 5, wherein in generating and displaying the list of query results of content file items that satisfy the text search criteria, the system is operative to display query results in relevance order based on the relevance score.

7. The system of claim 1, wherein the one or more content file stores include at least one of:
    an email mailbox;
    a local storage repository;
    a remote storage repository; and
    a storage repository associated with an email account.

8. The system of claim 1, wherein in inserting, in the composition stream, the portion of the contents of the selected content file item, the system is operative to replace the trigger input and the text search criteria with the portion of the contents.

9. The system of claim 1, wherein the system is further operative to remove at least one of the trigger input and the text search criteria from the composition stream.

10. The system of claim 1, wherein the list of query results is displayed in a pop up menu in a user interface of a content authoring application used to author or edit the composition stream.

11. The system of claim 1, wherein the composition stream is one of:
    an electronic message; or
    a productivity application file.

12. The system of claim 1, wherein in generating and displaying the list of query results, the system is operative to:
    visually display the text string within the location where the text string is found in association with the content file items in the list, wherein:
        each of the content file items is represented by a title of the respective content file item that is visually displayed in the list; and
        for one or more of the content file items where the location of the text string is not in the title of the one or more content file items, both the title of the one or more content file items and the text string within the tag, the author, or the contents of the one or more content file items are visually displayed in the list.

13. A computer-implemented method for attaching a content file to a composition stream, comprising:
    detecting a trigger input in a composition stream;
    responsive to detection of the trigger input, receiving a text search criteria in the composition stream subsequent to the trigger input;
    responsive to receiving the text search criteria in the composition stream, querying one or more content file stores for content file items satisfying the text search criteria, wherein the query is executed on one or more of titles, tags, authors, and contents of content file items within the one or more content file stores;

generating and displaying a list of query results of content file items that satisfy the text search criteria, wherein the content file items are ordered in the list based on a similarity of a text string found in the content file items to the text search criteria and a location where the text string is found, the location being one or more of the titles, the tags, the authors, and the contents of the content file items;

receiving a selection of a content file item from the list of query results, wherein the text string is found in at least the contents of the selected content file item; and in response to receiving the selection, inserting, in the composition stream, a portion of the contents of the selected content file item that includes the text string.

14. The computer-implemented method of claim 13, wherein detecting the trigger input comprises receiving a character or sequence of characters associated with an inline command for attaching a content file item.

15. The computer-implemented method of claim 13, wherein receiving the text search criteria comprises receiving a text string entered subsequently to the trigger input.

16. The computer-implemented method of claim 13, wherein querying the one or more content file stores comprises further executing the query on one or more of:
  a subject of an email message to which the content file item is attached;
  a sender's name of an email message to which the content file item is attached; and
  content of an email message to which the content file item is attached.

17. The computer-implemented method of claim 13, wherein inserting, in the composition stream, the portion of the contents of the selected content file item comprises replacing the trigger input and the text search criteria in the composition stream with the portion of the contents of the selected content file item.

18. The computer-implemented method of claim 13, further comprising removing at least one of the trigger input and the text search criteria from the composition stream.

19. A computer readable storage medium including computer readable instructions, which when executed by a processing unit is operative to:
  detect a trigger input in a composition stream;
  responsive to detection of the trigger input, receive a text search criteria in the composition stream, wherein the text search criteria comprises a text string entered subsequent to the trigger input;
  responsive to receiving the text search criteria in the composition stream, query one or more content file stores for content file items satisfying the text search criteria, wherein the query is executed on one or more of titles, tags, authors, and contents of content file items within the one or more content file stores;
  generate and display a list of query results of content file items that satisfy the text search criteria, wherein the content file items are ordered in the list based on a similarity of a text string found in the content file items to the text search criteria and a location where the text string is found, the location being one or more of the titles, the tags, the authors, and the contents of the content file items;
  receive a selection of a content file item from the list of query results, wherein the text string is found in at least the contents of the selected content file item; and
  in response to receiving the selection, insert, in the composition stream, a portion of the contents of the selected content file item that includes the text string, wherein inserting the portion of the contents of the selected content file item comprises replacing the trigger input and the text search criteria in the composition stream with the portion of the contents of the selected content file item.

20. The system of claim 1, wherein at least a first content file item comprising a first text string found in a title of the first content file item and a second content file item comprising a second text string found in content of the second content file item satisfy the text search criteria, and
  in generating and displaying the list of query results, the system is operative to:
    order the first content file item and the second content file item relative to one another within the list based on at least:
      a similarity of the first text string and the second text string to the text search criteria, and
      the title and the content being the respective locations where the first text string and the second text string are found in the first content file item and the second content file item; and
    visually display, within the list, the first text string within the title of the first content file item in association with the first content file item and the second text string within the content of the second content file item in association with the second content file item.

\* \* \* \* \*